US009282405B2

(12) United States Patent
Feng et al.

(10) Patent No.: US 9,282,405 B2
(45) Date of Patent: Mar. 8, 2016

(54) AUTOMATIC MICROPHONE MUTING OF UNDESIRED NOISES BY MICROPHONE ARRAYS

(71) Applicant: Polycom, Inc., San Jose, CA (US)

(72) Inventors: Jinwei Feng, Woburn, MA (US); Peter L. Chu, Lexington, MA (US)

(73) Assignee: Polycom, Inc., San Jose, CA (US)

( * ) Notice: Subject to any disclaimer, the term of this patent is extended or adjusted under 35 U.S.C. 154(b) by 259 days.

(21) Appl. No.: 13/865,001

(22) Filed: Apr. 17, 2013

(65) Prior Publication Data

US 2013/0294612 A1 Nov. 7, 2013

Related U.S. Application Data

(60) Provisional application No. 61/637,358, filed on Apr. 24, 2012.

(51) Int. Cl.
*H04R 3/00* (2006.01)
*H04N 7/15* (2006.01)
*H04R 3/02* (2006.01)

(52) U.S. Cl.
CPC *H04R 3/005* (2013.01); *H04N 7/15* (2013.01); *H04R 3/02* (2013.01); *H04R 2430/01* (2013.01)

(58) Field of Classification Search
USPC ............. 381/71.1, 94.1, 122, 356, 66, 92; 379/406.01; 370/286; 348/14.09, 14.16
See application file for complete search history.

(56) References Cited

U.S. PATENT DOCUMENTS 6,922,206 B2 * 7/2005 Chu et al. ............... 348/14.09
7,843,486 B1 11/2010 Blair et al.

| 2009/0022336 A1 | 1/2009 | Visser et al. |
| 2009/0164212 A1 | 6/2009 | Chan et al. |
| 2010/0158268 A1 | 6/2010 | Marton et al. |
| 2010/0166219 A1* | 7/2010 | Marton ............................ 381/98 |
| 2011/0285808 A1* | 11/2011 | Feng et al. ................. 348/14.09 |

FOREIGN PATENT DOCUMENTS

| EP | 2472904 | 7/2012 |
| JP | 6482887 A | 3/1989 |
| JP | 01-125098 A | 5/1989 |
| JP | 1-82887 | 6/1989 |
| JP | 2006304125 A | 11/2006 |
| JP | 2008054071 A | 3/2008 |
| JP | 2011-244455 | 12/2011 |
| TW | 200849219 | 12/2008 |

(Continued)

OTHER PUBLICATIONS

Japanese Office Action issued in co-pending JP Patent Application No. 2013-090813, dated Feb. 3, 2015, 5 pages (including translation).
Taiwanese Office Action issued in co-pending TW Patent Application No. 102114432, dated Jan. 12, 2015, 6 pages (including translation).

(Continued)

*Primary Examiner* — Vivian Chin
*Assistant Examiner* — Friedrich W Fahnert
(74) *Attorney, Agent, or Firm* — Blank Rome, LLP

(57) ABSTRACT

Methods and systems for cancellation of table noise in a speaker system used for video or audio conferencing are disclosed. Table noise is cancelled by using a vertical microphone array to distinguish the tilt angle of sound received by a microphone. If the sound is close to horizontal, the audio is muted. If the sound is above a given angle from horizontal, it is not muted, as this indicates a person speaking. This eliminates paper rustling, keyboard clicks and the like.

10 Claims, 3 Drawing Sheets

(56) References Cited

FOREIGN PATENT DOCUMENTS

| | | |
|---|---|---|
| TW | 200939210 | 9/2009 |
| TW | 201015541 | 4/2010 |
| WO | 2010/074583 | 7/2010 |
| WO | 2010074583 | 7/2010 |

OTHER PUBLICATIONS

Notice of Grounds for Rejection (Office Action) Patent Application No. 2013-090813, dated Mar. 6, 2014 (Five pgs).

European Search Report issued in co-pending European Application No. 13164412.2, dated Jul. 25, 2013, 5 pages.

* cited by examiner

AUTOMATIC MICROPHONE MUTING OF UNDESIRED NOISES BY MICROPHONE ARRAYS

RELATED APPLICATIONS

This application is a non-provisional application of Ser. No. 61/637,358, titled "Automatic Microphone Muting of Noises by Microphone Arrays," filed Apr. 24, 2012, which is incorporated herein by reference.

FIELD OF THE INVENTION

The invention relates to speakerphones and other desk or table-located microphone systems.

BACKGROUND OF THE INVENTION

There are often undesirable noises occurring continuously during an audio or video conference. Examples of these noises include keyboard sounds and paper rustling. These noises can be distracting, particularly during audio or video conferences with a large group of people when one person's keyboard can disrupt another person's speech. Thus, it is highly desirable to automatically mute the microphone when these sounds are present and no one is talking. However, there is no reliable method to discriminate between speech sounds and noises.

One example of a prior method of dealing with this issue is disclosed in U.S. Patent Application Pub. No. 2008/0279366 which addressed this problem by providing a signal from the user's keyboard to the conferencing application such that the user's computer provides a signal when a key is depressed on the keyboard. The conferencing application, either executing on the computer or on a separate device, mutes the microphone for a period of time upon receiving the key depression signal. While this method is helpful in eliminating keyboard noises, it is problematic because while the keyboard sound is muted, so is any speech occurring at the same time. This can cause gaps in speech and result in confusion and disruption of the conference. Moreover, this method does not eliminate other noises in the environment such as paper rustling or ringing of a cell phone.

SUMMARY OF THE INVENTION

In one embodiment according to the present invention, a vertical microphone array is used to distinguish the tilt angle of a received sound. If the sound is close to horizontal, the audio is muted. This eliminates paper rustling, keyboard clicks and the like. If the sound is above a given angle from horizontal, it is not muted, as this indicates a person speaking.

BRIEF DESCRIPTION OF THE FIGURES

The accompanying drawings, which are incorporated in and constitute a part of this specification, illustrate an implementation of apparatus and methods consistent with the present invention and, together with the detailed description, serve to explain advantages and principles consistent with the invention.

DETAILED DESCRIPTION OF THE PREFERRED EMBODIMENTS

Figure 1:
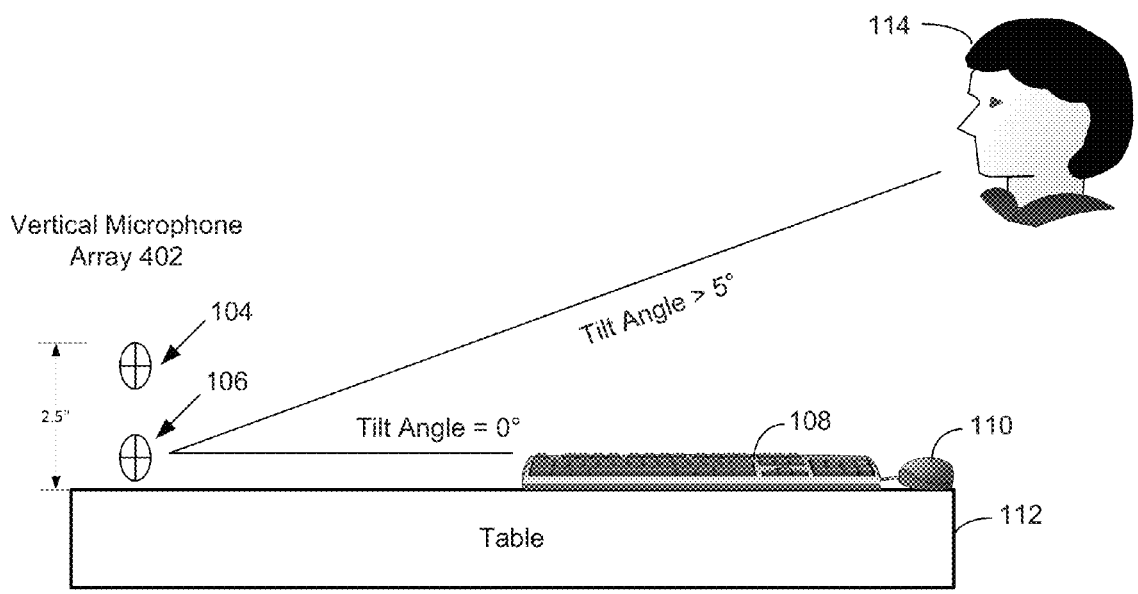
FIG. 1 is an illustration of a microphone configuration according to one embodiment of the present invention.

FIG. 1 illustrates a vertical array microphone 102 consisting of two microphones 104 and 106. As shown the microphone 106 is near the horizontal surface of the table and the microphone 104 is located above the microphone 106. When the vertical microphone array 102 is placed on the table 112, using techniques described in U.S. Pat. Nos. 7,787,328; 6,912,178 and 5,778,082, which are all hereby incorporated by reference, it is possible to estimate the tilt angle of the sound source using a processor. Sounds emitted by rustling papers, clicks of the keyboard 108 or the mouse no, or cell phone noise and the like originate close to the table surface and therefore have a low tilt angle, deviating generally less than two degrees from horizontal. On the other hand, for a person such as the participant 114 seated at the table, his/her mouth will be about one foot above the table height. At a distance of six feet, sounds from a talker's mouth will result in a tilt angle at the array of a $\tan(1/6)=9.5$ degrees. Thus by measuring tilt angles and estimating what angles correspond to a person's speech and which ones correspond to table noise, the speech can be distinguished from table noise.

Tilt angle measurements can be made periodically in short intervals. In the preferred embodiment of the present invention, tilt angle measurements are made every 20 ms. If the tilt angle measured is below a predetermined angle, the audio is muted for that 20 ms interval. Otherwise, the audio is not muted. Therefore when someone is talking and there are no table sounds, the talker's speech will be transmitted with no artifacts.

In addition to situations when the sound is all from table noise and situations when all the sounds originate from a participant talking, sometimes during conferences as the participant is talking they are also typing on a keyboard or causing other noise in the environment. Although table noise can be distracting during conferences, it is preferable to hear these noises if they are being generated simultaneously as a speech by the same participant, than to also remove the speech. To ensure that speech which is accompanied by table noise is not removed, the system is configured such that if a sound source is detected in two 20 ms intervals as originating from a tilt angle greater than five degrees, no muting is allowed for the next half-second. During simultaneous table noise and speech, the result is that both table noise and speech will be heard. However, within half-second after the person stops speaking the table noise will be muted.

Figure 2:
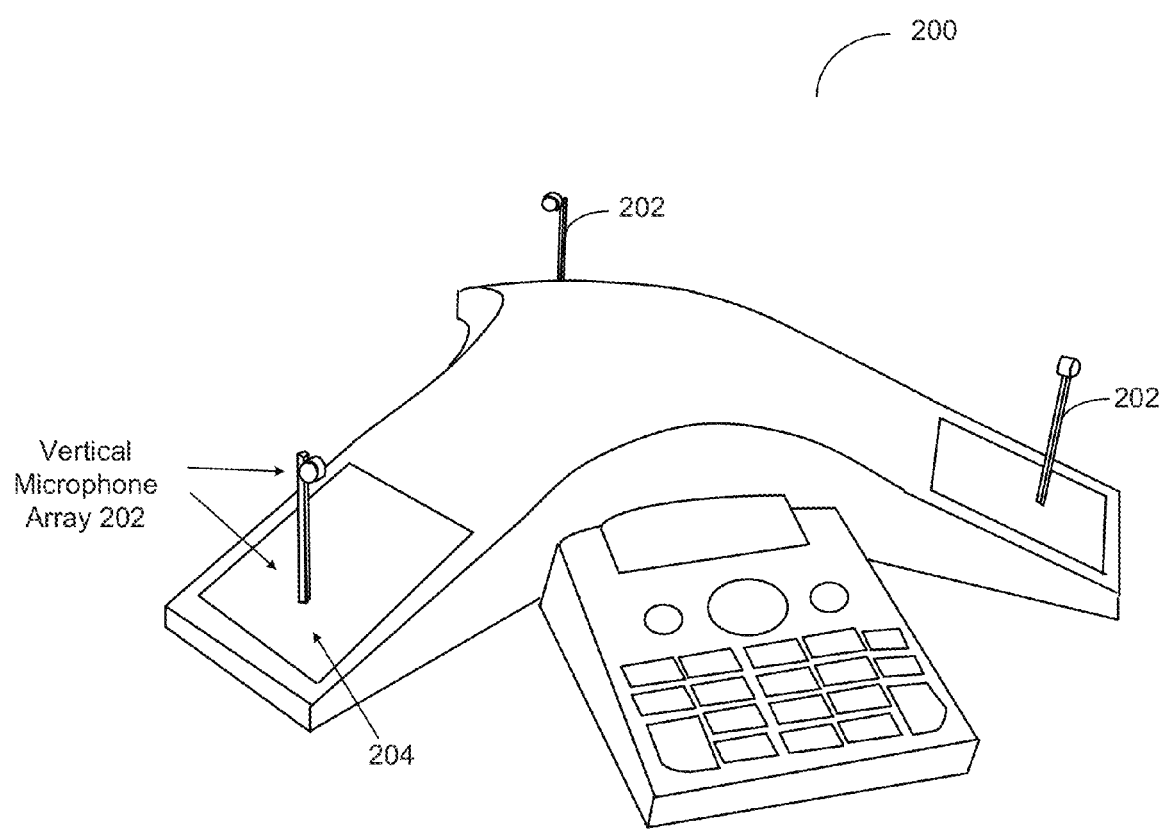
FIG. 2 is an illustration of a speakerphone configured with a second microphone array according to one embodiment of the present invention.

FIG. 2 shows an exemplary speakerphone 200 implementing the above discussed tilt angle measurements. In the speakerphone 200 the vertical microphone arrays 202 are unidirectional microphones a few inches away from and pointing away from the loudspeaker 204. This configuration provides sufficient vertical separation between the microphone and the loudspeakers to achieve adequate echo cancellation of the loudspeaker sound.

Figure 3:
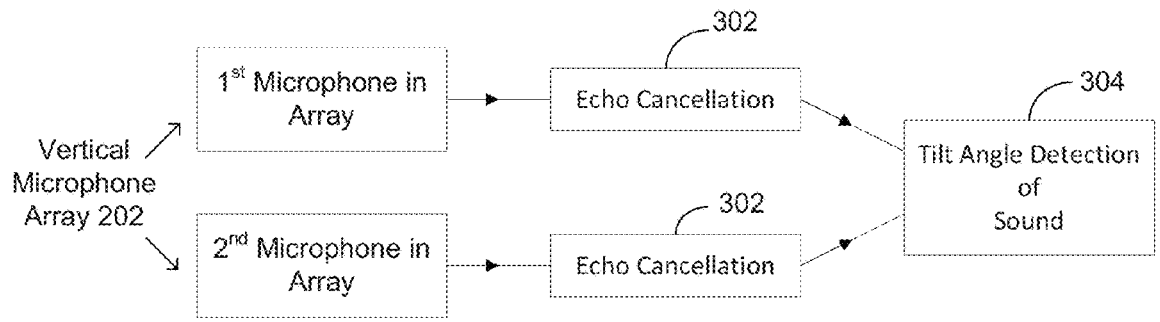
FIG. 3 is a block diagram of the signal processing according to one embodiment of the present invention.

FIG. 3 illustrates a block diagram of the microphone arrays 202. As shown in FIG. 3, the microphones in the vertical microphone arrays 202 each require acoustic echo cancellation of the loudspeaker signal, so that the table noise rejection can occur when the far-end is speaking in a conference call. Thus, signals from each microphone in the microphone arrays go through an echo cancellation module 302 before being sent to the tilt angle detection module 304 for determining the tilt angle of the sound.

Figure 4:
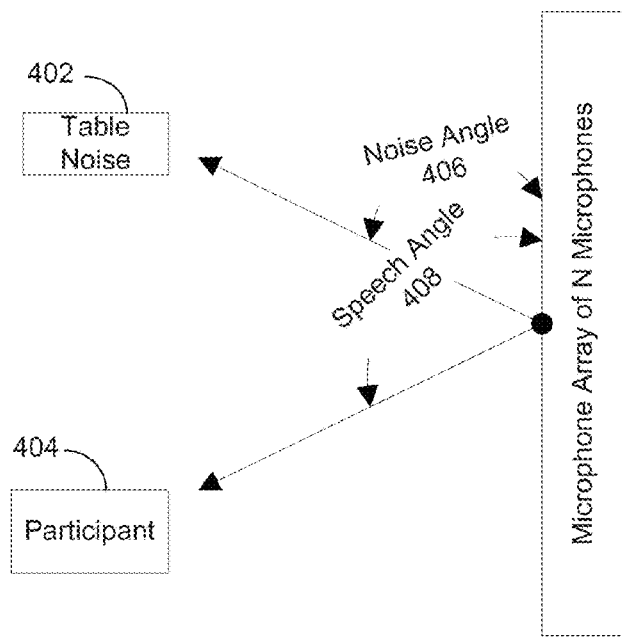
FIG. 4 is an illustration generalizing the embodiments for arbitrary number of microphones and speaker and noise angles according to one embodiment of the present invention.

Although only two microphones are shown in the microphone arrays 202, it should be understood that plurality of microphones can be used. FIG. 4 illustrates how the above tilt angle measurement can be applied to a microphone array of N microphones. No matter how many microphones are used in the array, the system always measures tilt angles for the sounds received at each microphone. As shown in FIG. 4, the noise angle 406 of the table noise 402 is generally always smaller than the speech angle 408 of the participant 404's speech. Thus, by measuring tilt angle of sound received at each microphone, the noise cancellation method discussed can be easily generalized to an arbitrary number of microphones and arbitrary angles for participant location and noise location.

Accordingly tilt angle measurement can be used to efficiently and effectively eliminate noise generated around the table while any speech by the participant is passed through.

It should be emphasized that the previously described embodiments of the present invention, particularly any preferred embodiments, are merely possible examples of implementations, set forth for a clear understanding of the principles of the invention. Many variations and modifications may be made to the previously described embodiments of the invention without departing substantially from the spirit and principles of the invention. All such modifications and variations are intended to be included herein within the scope of this disclosure and the present invention and protected by the following claims.

We claim:

1. A microphone system comprising:
   a vertical microphone array having at least two microphones, with a first microphone near a horizontal surface and a second microphone located above said first microphone; and
   a processor coupled to said microphone array to receive sound from said first and second microphones and configured to determine an angle from horizontal of a received sound and mute said sound if said angle from horizontal is below a predetermined amount.

2. The microphone system of claim 1, further comprising at least one loudspeaker.

3. The microphone system of claim 2, wherein at least one of the microphones is a vertical distance away from the loudspeaker.

4. The microphone system of claim 1, further comprising an echo cancellation module for each microphone in said vertical microphone array.

5. The microphone system of claim 4, wherein said echo cancellation modules provide echo cancellation of sounds from a loudspeaker signal.

6. A noise cancellation method comprising: providing a vertical microphone array having at least two microphones, with a first microphone near a horizontal surface and a second microphone located above said first microphone; and receiving sounds from said first and second microphones; and determining an angle from horizontal of a received sound and muting by a processor said sound if said angle from horizontal is below a predetermined amount.

7. The noise cancellation method of claim 6, further providing at least one loudspeaker.

8. The noise cancellation method of claim 7, wherein at least one of the microphones is a vertical distance away from the loudspeaker.

9. The noise cancellation method of claim 6, further providing an echo cancellation module for each microphone in said vertical microphone array.

10. The noise cancellation method of claim 9, further comprising providing echo cancellation of sounds from a loudspeaker signal by the echo cancellation modules.

* * * * *